US012743645B2

(12) United States Patent
Lee

(10) Patent No.: US 12,743,645 B2
(45) Date of Patent: Sep. 22, 2026

(54) METHOD AND APPARATUS FOR GENERATING GROVER ORACLE QUANTUM CIRCUIT, AND GROVER ORACLE QUANTUM CIRCUIT USING THE SAME

(71) Applicant: ELECTRONICS AND TELECOMMUNICATIONS RESEARCH INSTITUTE, Daejeon (KR)

(72) Inventor: You-Seok Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 738 days.

(21) Appl. No.: 18/300,838

(22) Filed: Apr. 14, 2023

(65) Prior Publication Data

US 2024/0070505 A1 Feb. 29, 2024

(30) Foreign Application Priority Data

Aug. 30, 2022 (KR) ........................ 10-2022-0108939

(51) Int. Cl.
*G06N 10/20* (2022.01)
*G06N 10/80* (2022.01)

(52) U.S. Cl.
CPC ............. *G06N 10/20* (2022.01); *G06N 10/80* (2022.01)

(58) Field of Classification Search
CPC ............................... G06N 10/20; G06N 10/80
See application file for complete search history.

(56) References Cited

U.S. PATENT DOCUMENTS 7,028,275 B1 4/2006 Chen
10,171,088 B1 1/2019 Kim
(Continued)

FOREIGN PATENT DOCUMENTS

CN 116541947 A * 8/2023 ............. G06F 30/15
KR 10-2019-0007375 A 1/2019

OTHER PUBLICATIONS

Ju, Yi-Lin, I-Ming Tsai, and Sy-Yen Kuo. "Quantum circuit design and analysis for database search applications." IEEE Transactions on Circuits and Systems I: Regular Papers 54.11 (2007): 2552-2563. (Year: 2007).*

(Continued)

*Primary Examiner* — Randall K. Baldwin

(57) ABSTRACT

Disclosed herein are a method and apparatus for generating a Grover oracle quantum circuit, and the Grover oracle quantum circuit using the same. The method may include analyzing data qubits and sub-qubits used for a design of an analysis target cipher quantum circuit configured to implement an analysis target cipher based on the analysis target cipher quantum circuit, generating a dagger quantum circuit based on the analysis target cipher quantum circuit, generating a phase inversion quantum circuit configured to invert a phase of a target qubit by comparing output qubits of the analysis target cipher quantum circuit with a preset comparison target value, configuring a Grover oracle using the analysis target cipher quantum circuit, the dagger quantum circuit, and the phase inversion quantum circuit, allocating the data qubits and the sub-qubits, and generating a Grover oracle quantum circuit based on allocation information of the data qubits and the sub-qubits.

17 Claims, 5 Drawing Sheets

(56) References Cited

U.S. PATENT DOCUMENTS

| | | | | |
|---|---|---|---|---|
| 2008/0140749 | A1* | 6/2008 | Amato | G06N 10/60 708/490 |
| 2019/0220782 | A1* | 7/2019 | Chen | G06N 10/20 |
| 2020/0280438 | A1 | 9/2020 | Menon | |
| 2020/0313879 | A1 | 10/2020 | Hong | |
| 2022/0164496 | A1 | 5/2022 | Oh | |
| 2022/0414508 | A1* | 12/2022 | Shyamsundar | G06N 10/00 |
| 2024/0169234 | A1* | 5/2024 | Ishii | G06N 10/20 |
| 2024/0296366 | A1* | 9/2024 | Ishii | G06N 10/70 |
| 2026/0044762 | A1* | 2/2026 | Giurgica-Tiron | G06N 10/00 |

OTHER PUBLICATIONS

Grassl, Markus, et al. “Applying Grover’s algorithm to AES: quantum resource estimates.” arXiv preprint arXiv:1512.04965 (2015). (Year: 2015).*

Almazrooie, Mishal, et al. “Quantum exhaustive key search with simplified-DES as a case study.” SpringerPlus 5.1 (2016): 1494. (Year: 2016).*

Meuli, Giulia, et al. “The role of multiplicative complexity in compiling low T-count oracle circuits.” 2019 IEEE/ACM International Conference on Computer-Aided Design (ICCAD). IEEE, 2019. (Year: 2019).*

Lee, Jongheon, et al. “Tâdepth reduction method for efficient SHAâ256 quantum circuit construction.” IET Information Security 17.1 (2022): 46-65. (Year: 2022).*

Li, Liyi, et al. “Verified Compilation of Quantum Oracles.” arXiv preprint arXiv:2112.06700 v2 (Apr. 2022). (Year: 2022).*

Tambde, Ayush. “A Programming Language for Quantum Oracle Construction.” arXiv preprint arXiv:2110.12487 (2021). (Year: 2021).*

Marek Perkowski, “Inverse Problems, Constraint Satisfaction, Reversible Logic, Invertible Logic and Grover Quantum Oracles for Practical Problems,” International Conference on Reversible Computation, Jul. 9, 2020.

Samuel Jaques et al., “Implementing Grover oracles for quantum key search on AES and LowMC,” Lecture Notes in Computer Science, Oct. 3, 2019.

N. Khammassi et al., “cQASM v1.0 Towards a Common Quantum Assembly Language,” arXiv:1805.09607v1 [quant-ph], May 24, 2018.

* cited by examiner

METHOD AND APPARATUS FOR GENERATING GROVER ORACLE QUANTUM CIRCUIT, AND GROVER ORACLE QUANTUM CIRCUIT USING THE SAME

CROSS REFERENCE TO RELATED APPLICATION

This application claims the benefit of Korean Patent Application No. 10-2022-0108939, filed Aug. 30, 2022, which is hereby incorporated by reference in its entirety into this application.

BACKGROUND OF THE INVENTION

1. Technical Field

The present disclosure relates generally to a method and apparatus for generating a Grover oracle quantum circuit, and the Grover oracle quantum circuit using the apparatus and method.

2. Description of the Related Art

Generally, a quantum computer is a new concept of computer that is capable of simultaneously processing multiple pieces of information using unique physical properties of quanta such as superposition or entanglement. As an alternative to overcome limited performance of classic computers attributable to a leakage current generated in microcircuits of current semiconductor chips, need for quantum computers has been gradually increased.

Element technologies related to quantum computers include technology for implementing a quantum bit (qubit), which is a quantum information unit, quantum algorithm technology, quantum error correction code (QECC) technology, quantum circuit technology, etc.

In order to analyze the key of symmetric key encryption using a Grover algorithm, which is a quantum calculation algorithm, among these element technologies, an analysis target cipher needs to be implemented using a quantum circuit.

A conventional Grover oracle is configured according to the design of the quantum circuit of the target cipher, and is inconvenient in that, when a scheme for implementing the quantum circuit of the same cipher is changed, an oracle needs to be configured again using the corresponding quantum circuit.

SUMMARY OF THE INVENTION

Accordingly, the present disclosure has been made keeping in mind the above problems occurring in the prior art, and an object of the present disclosure is to provide a method and apparatus for generating a Grover oracle quantum circuit, and the Grover oracle quantum circuit using the method and apparatus, which configure various Grover oracles using data qubit information and sub-qubit information of an analysis target cipher implemented using a quantum circuit.

In accordance with an aspect of the present disclosure to accomplish the above object, there is provided a method for generating a Grover oracle quantum circuit, including analyzing data qubits and sub-qubits that are used for a design of an analysis target cipher quantum circuit configured to implement an analysis target cipher based on the analysis target cipher quantum circuit, generating a dagger quantum circuit based on the analysis target cipher quantum circuit, generating a phase inversion quantum circuit configured to invert a phase of a target qubit by comparing output qubits of the analysis target cipher quantum circuit with a preset comparison target value, configuring a Grover oracle using the analysis target cipher quantum circuit, the dagger quantum circuit, and the phase inversion quantum circuit, allocating the data qubits and the sub-qubits, and generating a Grover oracle quantum circuit based on information about allocation of the data qubits and the sub-qubits.

A total number of qubits required for configuration of the analysis target cipher quantum circuit may correspond to a sum of a number of data qubits and a number of sub-qubits.

The dagger quantum circuit may be generated by compiling the analysis target cipher quantum circuit to create a Quantum Assembly Language (QASM) and by arranging the QASM in reverse order.

Data qubits and sub-qubits of the dagger quantum circuit may have sizes identical to those of the data qubits and the sub-qubits of the analysis target cipher quantum circuit, respectively.

The phase inversion quantum circuit may invert the phase of the target qubit when the output qubits of the analysis target cipher quantum circuit are identical to the comparison target value.

The phase inversion quantum circuit may include at least one of a multiple-controlled Toffoli gate having multiple-controlled qubits, or a Pauli-X gate, or a combination thereof.

The multiple-controlled Toffoli gate may be configured using a combination of Toffoli gates.

Output qubits of the phase inversion quantum circuit may be connected to the output qubits of the analysis target cipher quantum circuit, and a number of qubits identical to a number of output qubits of the phase inversion quantum circuit may be used as control qubits of a multiple-controlled Toffoli gate.

In accordance with another aspect of the present disclosure to accomplish the above object, there is provided an apparatus for generating a Grover oracle quantum circuit, including memory configured to store a control program for generating an oracle quantum circuit, and a processor configured to execute the control program stored in the memory, wherein the processor is configured to analyze data qubits and sub-qubits that are used for a design of an analysis target cipher quantum circuit configured to implement an analysis target cipher based on the analysis target cipher quantum circuit, generate a dagger quantum circuit based on the analysis target cipher quantum circuit, generate a phase inversion quantum circuit configured to invert a phase of a target qubit by comparing output qubits of the analysis target cipher quantum circuit with a preset comparison target value, configure a Grover oracle using the analysis target cipher quantum circuit, the dagger quantum circuit, and the phase inversion quantum circuit, allocate the data qubits and the sub-qubits, and generate a Grover oracle quantum circuit based on information about allocation of the data qubits and the sub-qubits.

The processor may be configured to perform control such that a total number of qubits required for configuration of the analysis target cipher quantum circuit corresponds to a sum of a number of data qubits and a number of sub-qubits.

The dagger quantum circuit may be generated by compiling the analysis target cipher quantum circuit to create a Quantum Assembly Language (QASM) and by arranging the QASM in reverse order.

The processor may be configured to control data qubits and sub-qubits of the dagger quantum circuit to have sizes identical to those of the data qubits and the sub-qubits of the analysis target cipher quantum circuit, respectively.

The processor may be configured to control the phase inversion quantum circuit to invert the phase of the target qubit when the output qubits of the analysis target cipher quantum circuit are identical to the comparison target value.

The phase inversion quantum circuit may include at least one of a multiple-controlled Toffoli gate having multiple-controlled qubits, or a Pauli-X gate, or a combination thereof.

The processor may be configured to perform control such that the multiple-controlled Toffoli gate is configured using a combination of Toffoli gates.

Output qubits of the phase inversion quantum circuit may be connected to the output qubits of the analysis target cipher quantum circuit, and a number of qubits identical to a number of output qubits of the phase inversion quantum circuit may be used as control qubits of a multiple-controlled Toffoli gate.

In accordance with a further aspect of the present disclosure to accomplish the above object, there is provided a Grover oracle quantum circuit, including an analysis target cipher quantum circuit configured to allocate an input value to input qubits and allocate an output value to output qubits, a phase inversion quantum circuit configured to receive an output of the analysis target cipher quantum circuit as an input, compare the output with a preset comparison target value, and invert a phase of a target qubit when the output is identical to the preset comparison target value, and a dagger quantum circuit configured to invert values of the output qubits to initial values.

A number of output qubits of the analysis target cipher quantum circuit may be set to a value identical to a number of control qubits of the phase inversion quantum circuit.

The dagger quantum circuit may be generated by compiling the analysis target cipher quantum circuit to create a Quantum Assembly Language (QASM) and by arranging the QASM in reverse order.

The phase inversion quantum circuit may invert the phase of the target qubit when the output qubits of the analysis target cipher quantum circuit are identical to the comparison target value.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
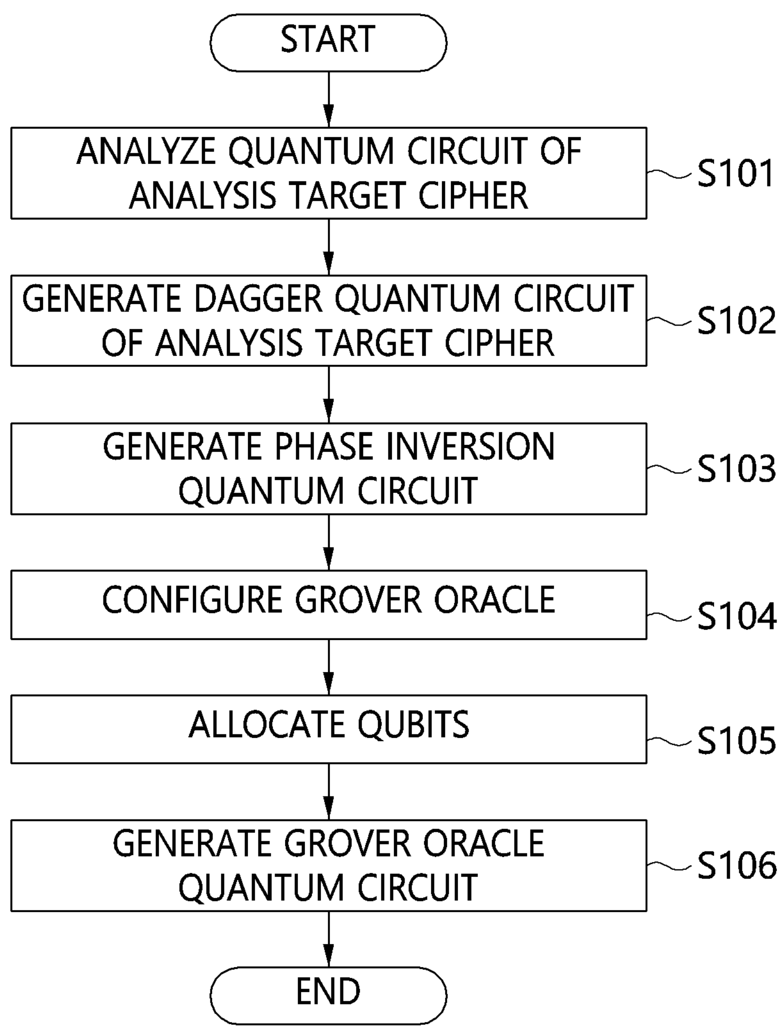
FIG. 1 is a flowchart illustrating a method for generating a Grover oracle quantum circuit according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a flowchart illustrating a method for generating a Grover oracle quantum circuit (hereinafter also referred to as a "Grover oracle quantum circuit generation method") according to an embodiment.

The Grover oracle quantum circuit generation method may be performed by an apparatus for generating a Grover oracle quantum circuit (hereinafter also referred to as a "Grover oracle quantum circuit generation apparatus").

Referring to FIG. 1, the Grover oracle quantum circuit generation apparatus may analyze the quantum circuit of an analysis target cipher at step S101. The oracle quantum circuit generation apparatus may analyze data qubits and sub-qubits that are used for a design based on the results of analysis.

The total number of qubits N_qubit required for configuring the quantum circuit of the analysis target cipher may be identical to the sum of the number of data qubits and the number of sub-qubits. The data qubits may be divided into qubits to which an input value and an output value are to be allocated. Here, the data qubits may allocate the input value to the input qubit. In this case, the number of data qubits may be identical to the number of qubits used to allocate the input value.

The Grover oracle quantum circuit generation apparatus may generate the dagger quantum circuit of the analysis target cipher at step S102. The dagger quantum circuit may be implemented using a previously configured circuit.

Figure 2:
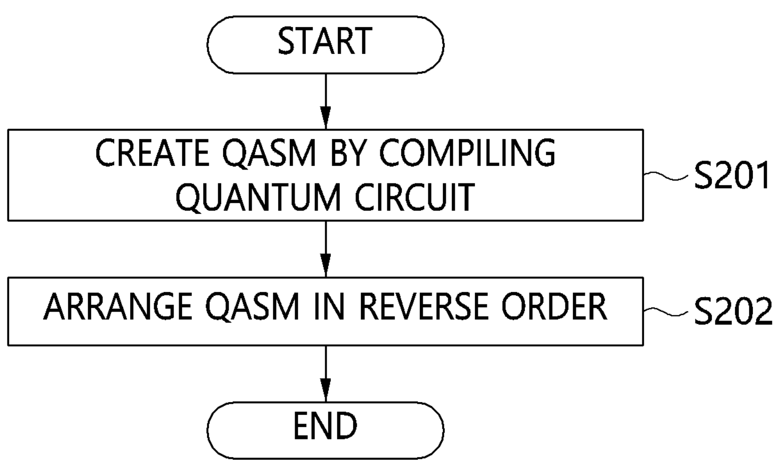
FIG. 2 is a flowchart illustrating a method for generating a dagger quantum circuit according to an embodiment.

FIG. 2 is a flowchart illustrating a method for generating a dagger quantum circuit according to an embodiment.

As illustrated in FIG. 2, the Grover oracle quantum circuit generation apparatus may create a Quantum Assembly Language (QASM) by compiling the quantum circuit of the analysis target cipher at step S201. Thereafter, the Grover oracle quantum circuit generation apparatus may generate the dagger quantum circuit by arranging the QASM in reverse order at step S202.

The data qubits and sub-qubits of the dagger quantum circuit may have the same sizes as the data qubits and sub-qubits of the analysis target cipher quantum circuit.

Referring back to FIG. 1, the Grover oracle quantum circuit generation apparatus may generate a phase inversion quantum circuit at step S103.

The phase inversion quantum circuit may compare the values of output data of the analysis target cipher with a preset comparison target value, and may invert the phase of a target qubit when all of the values of the output data are identical to the comparison target value.

Figure 3:
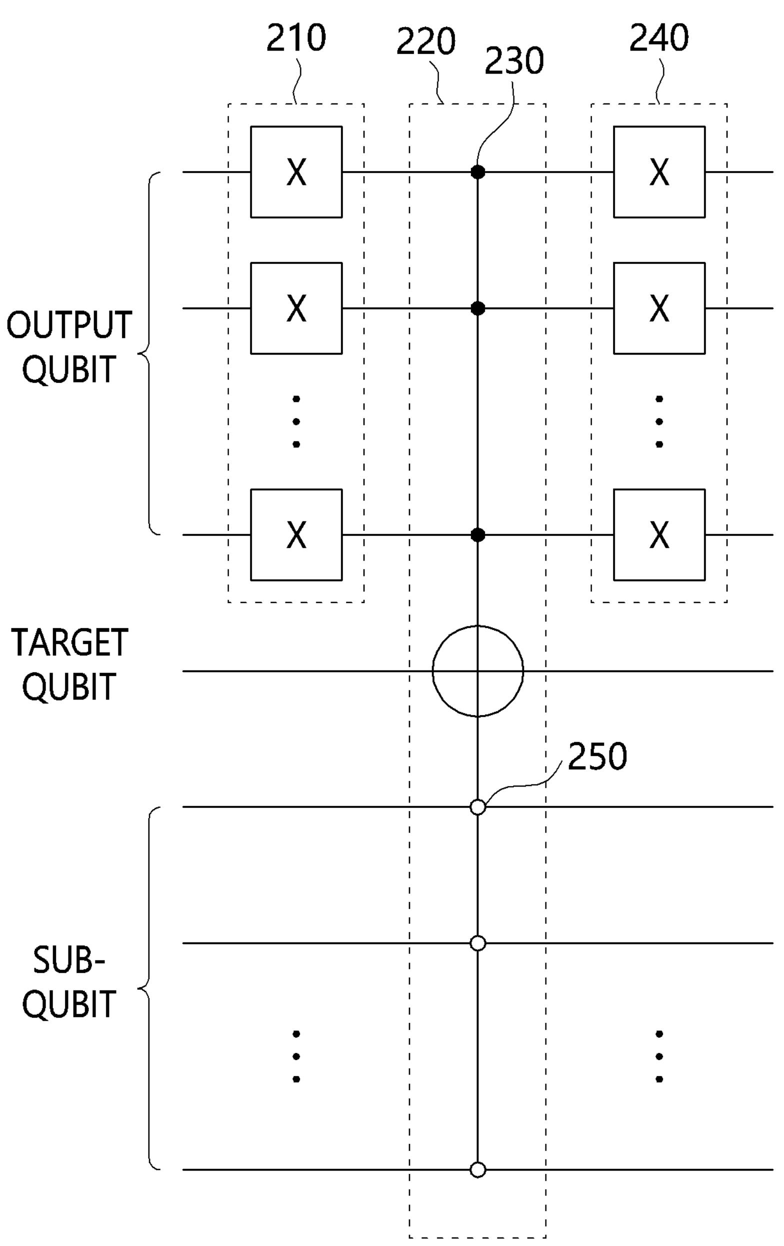
FIG. 3 is a diagram for explaining a method for generating a phase inversion quantum circuit according to an embodiment.

FIG. 3 is a diagram for explaining a method for generating a phase inversion quantum circuit according to an embodiment.

As shown in FIG. 3, the phase inversion quantum circuit may be a circuit for inverting the phase of a target qubit when all of the output qubits of the analysis target cipher quantum circuit are identical to a comparison target value, and may include a Pauli-X gate 210 and a multiple-controlled Toffoli gate 220.

The Pauli-X gate 210 may perform a function of comparing the output qubits with the comparison target value. The location of the Pauli-X gate 210 may vary with the comparison target value, and the Pauli-X gate 210 may be disposed at location at which the comparison target value is 0, thus allowing gate output to be 1.

The output qubits may be connected to the output qubits of the analysis target cipher quantum circuit, and a number of qubits identical to the number of output qubits may be used as control qubits 230 of the multiple-controlled Toffoli gate 220.

The control qubits 230 of the multiple-controlled Toffoli gate 220 may be configured such that the number of control qubits 230 is identical to the number of output qubits of the analysis target cipher quantum circuit. The multiple-controlled Toffoli gate 220 may be configured using various combinations of Toffoli gates.

As sub-qubits 250, initialized qubits may be used. Unlike this, uninitialized qubits may be used as the sub-qubits 250.

An X gate 240 may have the same configuration as the Pauli-X gate 210. The X gate 240 may return the qubit inverted by the Pauli-X gate 210 to the original state thereof.

Referring back to FIG. 1, the Grover oracle quantum circuit generation apparatus may configure a Grover oracle using the analysis target cipher quantum circuit, the dagger quantum circuit, and the phase inversion quantum circuit at step S104.

The Grover oracle quantum circuit generation apparatus may allocate data qubits and sub-qubits to generate the Grover oracle at step S105.

The Grover oracle quantum circuit generation apparatus may generate a Grover oracle quantum circuit using information about allocation of the qubits at step S106.

Figure 4:
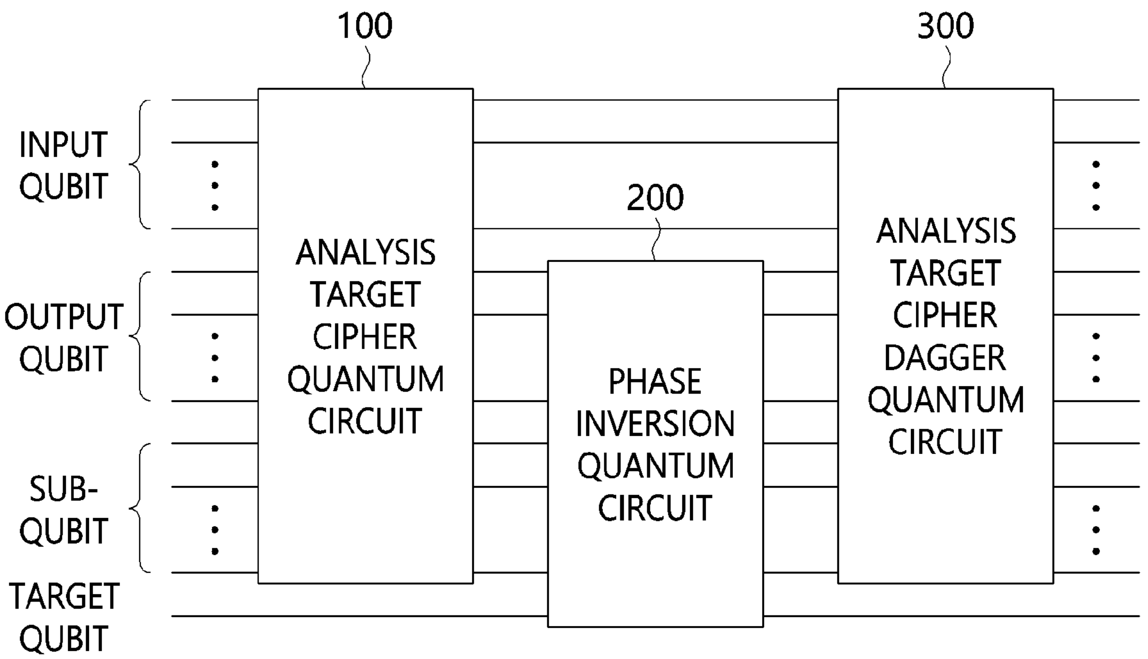
FIG. 4 is a block diagram illustrating the configuration of a Grover oracle quantum circuit according to an embodiment.

FIG. 4 is a block diagram illustrating the configuration of a Grover oracle quantum circuit according to an embodiment.

Referring to FIG. 4, the Grover oracle quantum circuit according to the embodiment may include an analysis target cipher quantum circuit 100, a phase inversion quantum circuit 200, and a dagger quantum circuit 300.

The input of the analysis target cipher quantum circuit 100 may be allocated to input qubits, and the output thereof may be allocated to output qubits. The output of the analysis target cipher quantum circuit 100 may be connected to the input of the phase inversion quantum circuit 200, and the number of output qubits of the analysis target cipher quantum circuit 100 may be set to the same number as the number of control qubits of the phase inversion quantum circuit 200.

The phase inversion quantum circuit 200 may compare the output (output qubits) of the analysis target cipher quantum circuit 100 with a previously provided cryptograph or comparison target value, and may invert the phase of a target qubit when all values of the output qubits are identical to the previously provided cryptograph or comparison target value. Thereafter, the values of the output qubits may be returned to initial values using the dagger quantum circuit 300. As sub-qubits used for circuit configuration, qubits initialized to 0 may be used.

The analysis target cipher quantum circuit 100 and the dagger quantum circuit 300 may also be configured without using sub-qubits, according to a circuit design scheme.

The Grover oracle quantum circuit generation apparatus according to an embodiment may be implemented in a computer system such as a computer-readable storage medium.

Figure 5:
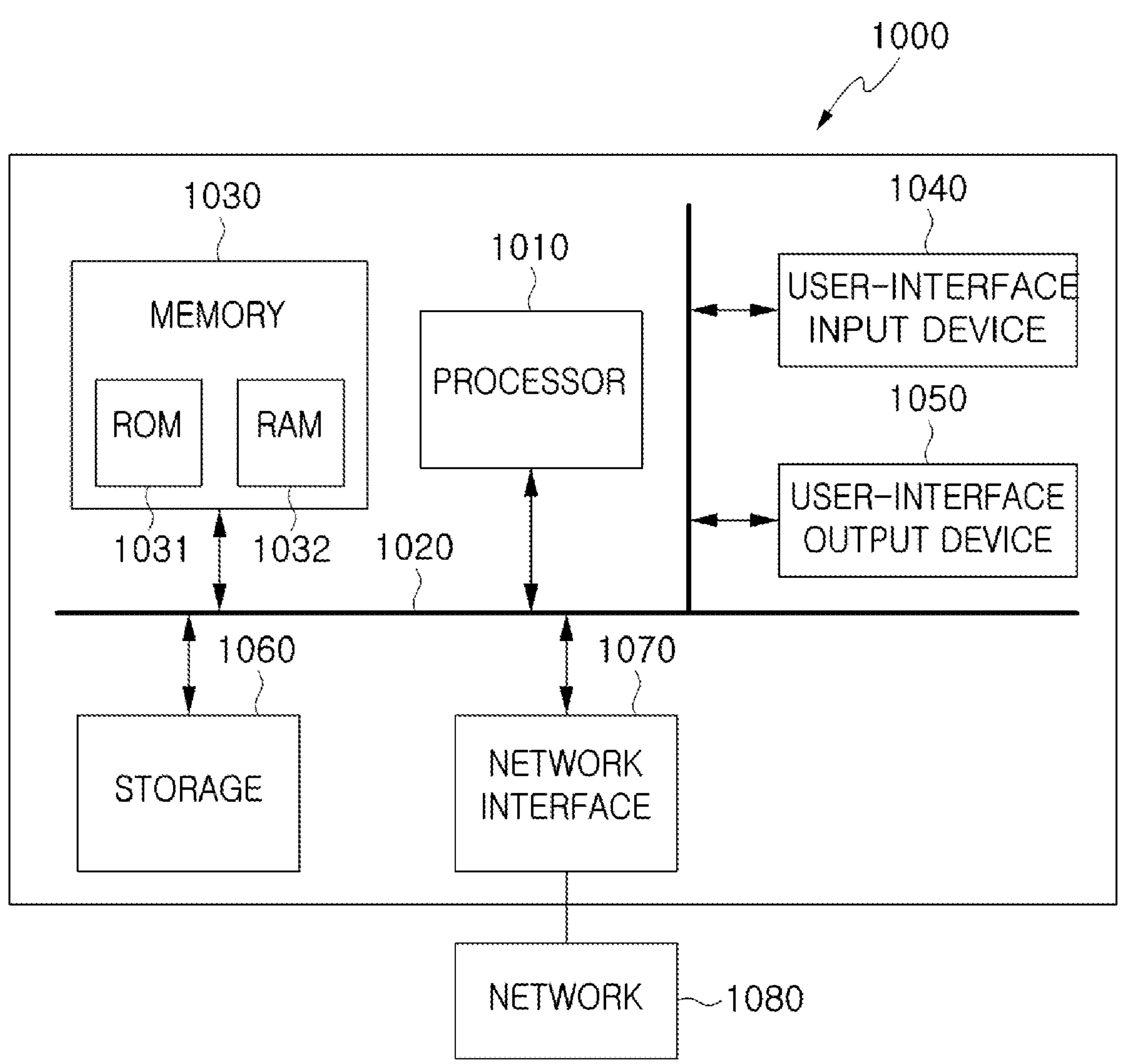
FIG. 5 is a block diagram illustrating the configuration of a computer system according to an embodiment.

FIG. 5 is a block diagram illustrating the configuration of a computer system.

Referring to FIG. 5, a computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the Grover oracle quantum circuit generation apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing a Grover oracle quantum circuit generation method according to an embodiment. In detail, the memory 1030 may store multiple applications executed by the Grover oracle quantum circuit generation apparatus, and data and instructions for the operation of the Grover oracle quantum circuit generation apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including an operation of analyzing data qubits and sub-qubits that are used for a design of an analysis target cipher quantum circuit configured to implement an analysis target cipher based on the analysis target cipher quantum circuit, an operation of generating a dagger quantum circuit based on the analysis target cipher quantum circuit, an operation of generating a phase inversion quantum circuit configured to invert a phase of a target qubit by comparing output qubits of the analysis target cipher quantum circuit with a preset comparison target value, an operation of configuring a Grover oracle using the analysis target cipher quantum circuit, the dagger quantum circuit, and the phase inversion quantum circuit, an operation of allocating the data qubits and the sub-qubits, and an operation of generating a Grover oracle quantum circuit based on information about allocation of the data qubits and the sub-qubits.

In accordance with an embodiment, a computer program stored in a computer-readable storage medium may include instructions enabling the processor to perform a method including an operation of analyzing data qubits and sub-qubits that are used for a design of an analysis target cipher quantum circuit configured to implement an analysis target cipher based on the analysis target cipher quantum circuit, an operation of generating a dagger quantum circuit based on the analysis target cipher quantum circuit, an operation of generating a phase inversion quantum circuit configured to invert a phase of a target qubit by comparing output qubits of the analysis target cipher quantum circuit with a preset comparison target value, an operation of configuring a Grover oracle using the analysis target cipher quantum circuit, the dagger quantum circuit, and the phase inversion quantum circuit, an operation of allocating the data qubits and the sub-qubits, and an operation of generating a Grover oracle quantum circuit based on information about allocation of the data qubits and the sub-qubits.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

The present disclosure may generate Grover oracles using various quantum circuits.

Further, the present disclosure may logically, easily configure a dagger circuit for the configuration of the Grover oracles.

Furthermore, the present disclosure may variously configure a phase inversion quantum circuit depending on whether the numbers of output qubits and sub-qubits used for an analysis target cipher quantum circuit are initialized.

Furthermore, the analysis target cipher quantum circuit according to the present disclosure may be replaced with various quantum circuits to which a Grover algorithm is to be applied, without being limited to ciphers.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for generating a Grover oracle quantum circuit, comprising:

providing an analysis target cipher quantum circuit configured to implement an analysis target cipher;

analyzing data qubits and sub-qubits used in the analysis target cipher quantum circuit;

generating a dagger quantum circuit by compiling the analysis target cipher quantum circuit to generate a Quantum Assembly Language (QASM) and arranging the QASM in reverse order;

generating a phase inversion quantum circuit configured to invert a phase of a target qubit when output qubits of the analysis target cipher quantum circuit match a preset comparison target value;

configuring a Grover oracle using the analysis target cipher quantum circuit, the dagger quantum circuit, and the phase inversion quantum circuit;

allocating the data qubits and the sub-qubits by designating a portion of a total qubit resource as the data qubits and a remaining portion as the sub-qubits; and generating the Grover oracle quantum circuit based on information about the allocation of the data qubits and the sub-qubits.

2. The method of claim 1, wherein a total number of qubits required for configuring the analysis target cipher quantum circuit corresponds to a sum of a number of the data qubits and a number of the sub-qubits.

3. The method of claim 1, wherein data qubits and sub-qubits of the dagger quantum circuit have sizes identical to the data qubits and the sub-qubits of the analysis target cipher quantum circuit, respectively.

4. The method of claim 1, wherein the phase inversion quantum circuit is configured to invert the phase of the target qubit in response to the output qubits of the analysis target cipher quantum circuit matching the preset comparison target value.

5. The method of claim 1, wherein the phase inversion quantum circuit comprises at least one of a multiple-controlled Toffoli gate having multiple-controlled qubits, or a Pauli-X gate, or a combination thereof.

6. The method of claim 5, wherein the multiple-controlled Toffoli gate is configured using a plurality of Toffoli gates.

7. The method of claim 6, wherein output qubits of the phase inversion quantum circuit are connected to control qubits of the multiple-controlled Toffoli gate, and wherein a number of the control qubits is identical to a number of the output qubits of the phase inversion quantum circuit.

8. An apparatus for generating a Grover oracle quantum circuit, comprising:

a memory configured to store a control program for generating the Grover oracle quantum circuit; and a processor configured to execute the control program stored in the memory, wherein the processor is configured to:

provide an analysis target cipher quantum circuit configured to implement an analysis target cipher;

analyze data qubits and sub-qubits used in the analysis target cipher quantum circuit;

generate a dagger quantum circuit by compiling the analysis target cipher quantum circuit to generate a Quantum Assembly Language (QASM) and arranging the QASM in reverse order;

generate a phase inversion quantum circuit configured to invert a phase of a target qubit when output qubits of the analysis target cipher quantum circuit match a preset comparison target value;

configure a Grover oracle using the analysis target cipher quantum circuit, the dagger quantum circuit, and the phase inversion quantum circuit;

allocate the data qubits and the sub-qubits by designating a portion of a total qubit resource as the data qubits and a remaining portion as the sub-qubits; and generate the Grover oracle quantum circuit based on information about the allocation of the data qubits and the sub-qubits.

9. The apparatus of claim 8, wherein the processor is configured to determine a total number of qubits required for configuring the analysis target cipher quantum circuit as a sum of a number of the data qubits and a number of the sub-qubits.

10. The apparatus of claim 8, wherein the data qubits and the sub-qubits of the dagger quantum circuit have sizes identical to the data qubits and the sub-qubits of the analysis target cipher quantum circuit, respectively.

11. The apparatus of claim 8, wherein the processor is configured to control the phase inversion quantum circuit to invert the phase of the target qubit in response to the output qubits of the analysis target cipher quantum circuit matching the preset comparison target value.

12. The apparatus of claim 8, wherein the phase inversion quantum circuit comprises at least one of a multiple-controlled Toffoli gate having multiple-controlled qubits, or a Pauli-X gate, or a combination thereof.

13. The apparatus of claim 12, wherein the processor is configured to configure the multiple-controlled Toffoli gate using a plurality of Toffoli gates.

14. The apparatus of claim 13, wherein output qubits of the phase inversion quantum circuit are connected to control qubits of the multiple-controlled Toffoli gate, and wherein a number of the control qubits is identical to a number of the output qubits of the phase inversion quantum circuit.

15. A Grover oracle quantum circuit, comprising:

an analysis target cipher quantum circuit configured to allocate an input value to one or more input qubits and an output value to one or more output qubits;

a phase inversion quantum circuit configured to receive the output value from the analysis target cipher quantum circuit, compare the output value with a preset comparison target value, and invert a phase of a target qubit when the output value matches the preset comparison target value; and a dagger quantum circuit electrically connected to output qubits of the phase inversion quantum circuit and configured to invert values of the output qubits of the phase inversion quantum circuit to initial values, wherein the dagger quantum circuit is generated by compiling the analysis target cipher quantum circuit to generate a Quantum Assembly Language (QASM) and arranging the QASM in reverse order.

16. The Grover oracle quantum circuit of claim 15, wherein a number of the output qubits of the analysis target cipher quantum circuit is identical to a number of control qubits within the phase inversion quantum circuit.

17. The Grover oracle quantum circuit of claim 15, wherein the phase inversion quantum circuit is configured to invert the phase of the target qubit in response to the output qubits of the analysis target cipher quantum circuit being identical to the preset comparison target value.

* * * * *